United States Patent
Fauth et al.

(10) Patent No.: US 9,295,369 B2
(45) Date of Patent: Mar. 29, 2016

(54) DISHWASHER HAVING CIRCULATION CIRCUITS

(75) Inventors: Michael Fauth, Pleinfeld (DE); Bernd Heisele, Sontheim (DE); Roland Rieger, Rainau (DE)

(73) Assignee: BSH Hausgeraete GmbH, Munich (DE)

( * ) Notice: Subject to any disclaimer, the term of this patent is extended or adjusted under 35 U.S.C. 154(b) by 295 days.

(21) Appl. No.: 13/055,181

(22) PCT Filed: Jul. 23, 2009

(86) PCT No.: PCT/EP2009/005369
§ 371 (c)(1),
(2), (4) Date: Feb. 1, 2011

(87) PCT Pub. No.: WO2010/009890
PCT Pub. Date: Jan. 28, 2010

(65) Prior Publication Data
US 2011/0132407 A1    Jun. 9, 2011

(30) Foreign Application Priority Data
Jul. 23, 2008    (DE) .......................... 10 2008 040 653

(51) Int. Cl.
*A47L 15/42* (2006.01)
*A47L 15/00* (2006.01)
(Continued)

(52) U.S. Cl.
CPC .......... *A47L 15/4291* (2013.01); *A47L 15/0015* (2013.01); *D06F 35/005* (2013.01); *D06F 39/006* (2013.01); *A47L 15/0057* (2013.01);
(Continued)

(58) Field of Classification Search
USPC .................................... 134/56 D, 57 D, 58 D
See application file for complete search history.

(56) References Cited

U.S. PATENT DOCUMENTS 2,664,094 A * 12/1953 Spragins ................... 134/58 DL
3,279,481 A * 10/1966 Neyhouse et al. .......... 134/57 D
(Continued)

FOREIGN PATENT DOCUMENTS

CN    1257689 A    6/2000
DE    3901169 A1   7/1990
(Continued)

OTHER PUBLICATIONS

National Search Report CN 200980132660.2.
(Continued)

*Primary Examiner* — David Cormier
(74) *Attorney, Agent, or Firm* — James E. Howard; Andre Pallapies (57) ABSTRACT

A dishwasher having a washing compartment for items to be washed and a first circulation circuit to subject the items to a washing liquid. The first circulation circuit includes a circulation pump; a water heater; and a spraying device. The washing liquid is routed from the washing compartment to the pump and fed back into the washing compartment. A second circulation circuit has the circulation pump, the water heater and a mixture store with input and output openings. An output side of the pump has a branching point that flow controllers are assigned to to allow the washing liquid to circulate in the first circulation circuit and/or the second circulation circuit. In the second circulation circuit, the washing liquid is routed from the washing compartment to the pump, pumped into the mixture store via the input opening, and fed back into the washing compartment via the output opening.

31 Claims, 4 Drawing Sheets

(51) Int. Cl.
*D06F 35/00* (2006.01)
*D06F 39/00* (2006.01)

(52) U.S. Cl.
CPC .......... *A47L 15/4221* (2013.01); *A47L 2601/02* (2013.01); *Y02B 40/54* (2013.01)

(56) References Cited

U.S. PATENT DOCUMENTS

| | | | |
|---|---|---|---|
| 5,167,722 A * | 12/1992 | Pastryk | ................. D06F 35/006 134/33 |
| 5,617,885 A | 4/1997 | Centis | |
| 5,829,459 A | 11/1998 | Milocco et al. | |
| 6,338,760 B1 | 1/2002 | Landaeus et al. | |
| 6,578,586 B2 | 6/2003 | Moh | |
| 2004/0103929 A1* | 6/2004 | Ha | .............................. 134/58 D |
| 2006/0237053 A1* | 10/2006 | Bengston | ............... A47L 15/502 134/58 D |
| 2007/0068562 A1* | 3/2007 | Wetzel et al. | ................ 134/56 D |
| 2009/0090402 A1 | 4/2009 | Tameishi et al. | |
| 2009/0283111 A1 | 11/2009 | Classen et al. | |

FOREIGN PATENT DOCUMENTS

| | | |
|---|---|---|
| DE | 4004057 A1 | 8/1991 |
| DE | 4243605 A1 | 6/1994 |
| EP | 0911439 A1 | 4/1999 |
| EP | 1264570 A1 * | 12/2002 |

OTHER PUBLICATIONS

Report of Examination CN 200980132660.2 dated Nov. 2, 2012.
Report of Examination Including National Search Report CN 200980128333.X.

* cited by examiner

DISHWASHER HAVING CIRCULATION CIRCUITS

This application is a U.S. National Phase Application of International Application No. PCT/EP2009/05369, filed 23 Jul. 2009, which designated the U.S. and claims the benefit of International Application No. PCT/EP2009/59018, filed 15 Jul. 2009, and German Application No. 10 2008 040 653.8, filed 23 Jul. 2008, the entire contents of each of which are hereby incorporated by reference. This application is also a Continuation In Part of International Application No. PCT/EP2009/59018, filed 15 Jul. 2009, which claims priority to German Application No. 10 2008 040 653.8, filed 23 Jul. 2008.

BACKGROUND OF THE INVENTION

The present invention relates to a dishwasher comprising a washing compartment for accommodating items to be washed and a first circulation circuit for subjecting items to be washed in the washing compartment to a washing liquid, wherein the first circulation circuit has a circulation pump for circulating the washing liquid, a water heater for heating the circulated washing liquid, and a spraying device for spraying the items to be washed with the circulated washing liquid, wherein in the first circulation circuit the washing liquid is routed from the washing compartment to the circulation pump and fed back into the washing compartment via the spraying device.

A dishwasher having such a circulation circuit is known from experience. In such a dishwasher, the items to be washed are subjected to washing liquid in a washing compartment, i.e. washing liquid which collects in a collection sump of the washing compartment is extracted by means of a circulation pump and is pumped back into the washing compartment via a spraying device. In this case, any required heating of the washing liquid is done by means of a water heater, this being arranged in the circulation circuit, at the same time as the items to be washed are subjected to the washing liquid.

However, the known dishwasher has the disadvantage that any heating of a washing liquid entails a warming of the washing compartment and/or the items to be washed that are located therein. Therefore, if the washing liquid to be warmed is not intended for immediate application to items to be washed, this results in unnecessary energy consumption and consequently in low efficiency of the dishwasher.

BRIEF SUMMARY OF THE INVENTION

The object of the present invention is to provide a dishwasher in which the efficiency is improved.

In the case of a dishwasher of the type cited in the introduction, the object is achieved by providing a branching point on an output side of the circulation pump in the first circulation circuit, flow control means being assigned to said branching point and allowing the washing liquid to circulate optionally in the first circulation circuit and/or a second circulation circuit, wherein the second circulation circuit comprises the circulation pump of the first circulation circuit, the water heater of the first circulation circuit and additionally a mixture store, wherein in the second circulation circuit the washing liquid is routed from the washing compartment to the circulation pump, is pumped into the mixture store or reservoir via an input opening, and is fed back into the washing compartment via an output opening of the mixture store.

A dishwasher having improved efficiency can be provided thus.

In particular, flow control means are understood to be means which can influence the flow of a washing liquid. In particular, provision is made for electrically operable flow control means, which allow the flow of washing liquid to be automatically controlled in a simple manner by a control device of the dishwasher.

In this case, a washing liquid (also called washing liquor) is understood to be preferably a liquid which is provided for the purpose of application to the items to be washed, in order to clean and/or otherwise treat them. For example, the washing liquid can therefore also be provided for warming the items to be washed, this being customary during a rinsing stage, for example. A washing liquid usually consists mainly of water. In this case, depending on the operating phase of the dishwasher, the washing liquid can be supplemented by cleaning agents, by cleaning aids, e.g. rinsing agents, and/or by dirt which has been detached from the items to be washed.

The flow control means are expediently configured such that in a first operating state the washing liquid can circulate at least essentially in the first circulation circuit. This allows conventional treatment of items to be washed, e.g. dishes. The flow control means are additionally designed such that in a second operating state the washing liquid can circulate at least essentially in the second circulation circuit. However, provision can also be made for further operating states if applicable, in which no circulation is possible or circulation in both circulation circuits is possible.

By controlling the flow control means accordingly, the washing liquid which is transported by the circulation pump can therefore be fed back into the washing compartment selectively in the first circulation circuit via the spraying device and/or in the second circulation circuit via the mixture store or reservoir.

When the second operating state of the flow control means is adopted, a major portion of the total volume of the washing liquid can be situated in the mixture store itself during the circulation in the second circulation circuit, which ultimately also means that only a minor portion of the circulated washing liquid is located in the washing compartment and can emit heat there.

If the washing liquid in the second circulation circuit is now circulated and heated in this way, the washing compartment, any insulation it may have, any items to be washed that are possibly located in the washing compartment, and any further dishwasher modules which are thermally connected to the washing compartment, will be warmed less than during the conventional heating of a washing liquid. In this way, a washing liquid can be warmed using less energy. Moreover, less water vapor is produced in the washing compartment, thereby further reducing the energy losses.

Furthermore, the output opening of the mixture store can be connected to the washing compartment in such a way that the washing liquid circulating in the second circulation circuit covers a shorter distance in the washing compartment, before reaching the collection sump, than occurs in the case of a washing liquid which circulates in the first circulation circuit and therefore enters the washing compartment via the spraying system. This results in the heat emission of the washing liquid in the washing compartment decreasing further.

A suitable arrangement of the mixture store provides for the output opening of the mixture store to correspond to an input opening of the washing compartment in such a way that the washing liquid which leaves the mixture store through the output opening enters the washing compartment through the input opening directly, i.e. without costly connection lines.

The proposed dishwasher advantageously allows washing liquid to be heated in both the first circulation circuit and in the second circulation circuit using only one single water heater. This allows a simple construction of the dishwasher according to the invention. For example, the water heater can be arranged in the washing compartment, in the collection sump, between the collection sump and the circulation pump, or between the circulation pump and the branching point.

For the purpose of circulating the washing liquid in both the first circulation circuit and the second circulation circuit, it is advantageously only necessary to provide a single circulation pump, since this can be arranged upstream of the branching point. This further simplifies the construction of the dishwasher according to the invention. The circulation pump can be connected on its input side to a collection sump which is arranged at the washing compartment for collecting washing liquid, wherein said circulation pump can preferably be arranged in or at the collection sump, which is therefore also referred to as a pump sump.

The dishwasher according to the invention is distinctive for its low energy consumption. The design overheads are relatively modest in this case, and the dishwasher can therefore be manufactured simply and economically. Consequently, the dishwasher according to the invention can be designed as a household dishwasher in particular.

According to an advantageous development of the invention, the washing liquid in the second circulation circuit is fed back into the washing compartment, preferably by overfilling, in such a way that it flows down a partial height or a full height of an inside of a wall, in particular a side wall, of the washing compartment. This ensures that the washing liquid circulating in the second circulation circuit does not come into contact with, or only slightly comes into contact with, items to be washed that are placed in racks. This applies even if, for design reasons, the washing liquid is introduced into the washing compartment in an upper region thereof. Heat emission from the washing liquid to the items to be washed is therefore avoided, thereby further increasing the efficiency of the dishwasher. In this case, it applies that the undesired tendency of the washing liquid to evaporate in the washing compartment is progressively reduced depending on how far down the washing liquid is introduced into the washing compartment, since the partial height over which the washing liquid flows down the wall is decreased thus. Therefore the washing liquid can preferably be introduced into a central region of the washing compartment, and most preferably into a lower region of the washing compartment.

According to an appropriate development of the invention, the output opening is connected to the washing compartment via a return line for the purpose of feeding back the washing liquid. A return line makes it possible, irrespective of the arrangement of the mixture store, to introduce the washing liquid into the washing compartment in such a way that it emits little heat there. The return line can run inside and/or outside the washing compartment.

According to an advantageous development of the invention, the return line leads into the washing compartment in a lower region of the washing compartment. For example, a downstream end section of the return line can run inside the washing compartment, wherein the outlet of the return line can be provided in particular in the vicinity of the collection sump or directly at the collection sump. A downstream end section of the return line can likewise run outside the washing compartment, wherein the outlet of the return line can be connected to an input opening of the washing compartment, which input opening can be provided in particular in the vicinity of the collection sump or directly at the collection sump. This can largely prevent any loss of heat of the washing liquid in the washing compartment.

According to an appropriate development of the invention, the output opening is designed as an overflow opening. This ensures a uniform level of washing liquid in the mixture store during the circulation, without costly control means in the region of the output opening. Per time unit, exactly the same volume of washing liquid leaves the mixture store via the overflow opening, as is supplied to the mixture store via the input opening. A circulation speed that is favorable for the heating, e.g. in the order of 20 to 30 l/min, can therefore easily be set by controlling the rotational speed of the circulation pump. A uniform circulation flow is produced in this case, and therefore the quantity of washing liquid located outside of the mixture store can be limited, thereby contributing to the energy efficiency, without the risk that the water heater could run dry, which could damage it.

According to an advantageous development of the invention, the input opening and the output opening are arranged at opposite end regions of the mixture store. This promotes a uniform temperature distribution within the heated washing liquid in a simple manner, because non-flowing regions in the mixture store are at least reduced. It is thereby possible to prevent damage to the dishwasher due to local temperature maxima in the heated washing liquid.

According to an appropriate development of the invention, flow guiding elements are provided in the mixture store. It is thereby possible further to reduce the formation of non-flowing or slow-flowing zones in the mixture store.

According to an advantageous development of the invention, the input opening is arranged at a lower end of the mixture store. As a result of this, the mixture store can be emptied via the input opening by utilizing the weight of the washing liquid. It is therefore easily possible to feed washing liquid that is held in the mixture store back into the first circulation circuit, e.g. if the washing liquid is required for treating the items to be washed.

According to an appropriate development of the invention, the flow control means comprise a water switch which has at least one controllable output, this being connected to at least one spraying element of the spraying device, and one further output, this being connected to a connection line that leads to the mixture store. A water switch is present in nearly all modern dishwashers and is used in particular to distribute washing liquid that is supplied by the circulation pump to various spraying elements of the spraying system of the dishwasher. The spraying system can comprise e.g. an upper rotatable spraying arm, a lower rotatable spraying arm and a fixed top sprinkler, wherein each of these spraying elements can be connected to an output of the water switch. The water switch can have various operating states, in which one of these outputs, more than one of these outputs or all of these outputs can be selectively opened or closed. The control of the water switch is automatic in this case.

Because the water switch is now advantageously provided with a further output for a connection line to the mixture store, the branching point can be integrated into the water switch, such that the design of the dishwasher can be simple in structure. The water switch can be configured such that all of the outputs provided for the spraying system can be closed simultaneously. In this way, it is possible without increased expense to interrupt the first circulation circuit if the washing liquid is to be fed via the second circulation circuit, e.g. in order to heat up the washing liquid without at the same time treating the items to be washed. The output for the connection line can be designed in such a way that it is controllable, or is always open.

According to an advantageous development of the invention, the flow control means comprise in particular a non-return valve, which is arranged in the connection line. Non-return valves are understood to be preferably valves which can interrupt a flow of liquid in both flow directions, unlike common water switches which can only block in one flow direction. It is therefore possible, using only one valve, to open or interrupt the second circulation circuit and to control the filling or emptying of the mixture store.

According to an appropriate development of the invention, the water heater is designed as a flow-through heater. A flow-through heater preferably comprises a water-carrying element, e.g. a pipe, at which or in which at least one heating element is arranged. A flow-through heater is characterized in this case by modest size, good efficiency, and uniform heating of the circulated washing liquid. The flow-through heater can be expediently integrated in the circulation pump. Alternatively or additionally, provision can also be made for a heating element which is arranged separately, e.g. a heating element which is arranged in the washing compartment or in the collection sump. However, flow-through heaters are more efficient, more resistant to damage, and can transfer a greater amount of heat to the washing liquid per time unit, particularly in the case of higher flow speeds.

According to an appropriate development of the invention, insulation means are provided for the mixture store, preferably all-round thermal insulation, which counteract any transfer of heat from the interior of the mixture store to the outside. Such insulation means counteract cooling of the washing liquid in the mixture store. The efficiency of the dishwasher can be increased thereby, particularly if the washing liquid is circulated for an extended period of time in the second circulation circuit, or is stored temporarily in the mixture store after circulation.

According to an advantageous development, provision is made for a control device whereby at least one washing program for controlling a washing routine for washing items to be washed in the washing compartment, and at least one preheating program for controlling a preheating cycle for preheating washing liquid for a washing routine, can be invoked separately in each case, wherein the preheating cycle comprises a heating phase, during which washing liquid is circulated and heated in the second circulation circuit.

According to the invention, the control device is provided for the purpose of automatically controlling operating sequences of the dishwasher. In order to achieve this, it can preferably be designed as a so-called sequence control, in particular an electronic sequence control.

At least one washing program is stored in the control device for the purpose of controlling a washing routine for washing items to be washed, in particular for washing dishes. In this case, provision is advantageously made for a plurality of washing programs, from which the operator can always select and start one. It is therefore possible to adapt the execution of a washing routine in particular to the load quantity, to the load type, to the degree of soiling of the items to be washed and/or to the desired duration of the washing routine.

Expediently, the relevant stored washing programs can comprise respectively at least one pre-washing stage for the pre-cleaning of items to be washed, at least one cleaning stage for the thorough cleaning of items to be washed, at least one intermediate washing stage for removing soiled washing liquid from the items to be washed, at least one rinsing stage to prevent stains on items to be washed and/or to prepare for a drying stage, and/or at least one drying stage for drying the items to be washed.

In addition to this, at least one preheating program is advantageously stored in the control device, for the purpose of controlling a preheating cycle for the preheating of washing liquid for a washing routine. In this case, provision can preferably be made for a plurality of preheating programs, in which washing liquid is preheated to respectively different temperatures, for example.

After completion of the preheating cycle in the dishwasher, the preheated washing liquor can be stored in the mixture store until a washing routine is started, made available for a specified specified wait time or lead time until the start of a washing routine of a selected dishwashing program, and utilized in the context of the washing routine for treating the items to be washed, whereby heating times during the washing routine can be shortened or eliminated. For example, the prewashing routine of the washing routine can be omitted.

In this case, a preheating program and a washing program can advantageously be started independently of each other by an operator of the dishwasher. The operator therefore has the possibility of starting the preheating program first, and then initiating a washing program at any desired subsequent time after completion of the preheating program. In the time between the completion of the preheating program and the start of the washing program, the dishwasher is advantageously in a wait mode. It is advantageously possible to delay loading of the items to be washed into the washing compartment of the dishwasher until after the preheating program has finished. In particular, the washing compartment and its one or more racks are largely dry in this case, and this is convenient for the user. In connection with shortening the duration of the washing program by virtue of the reduced heating times, it is thus possible also to shorten the time in which the items to be washed are not available for their intended use. This naturally does not exclude the dishwasher being already loaded, at least partially, before the preheating program is executed. Such a combination of preheating program and waiting phase is also referred to as "wait & run functionality". In this case, the inventive design of the dishwasher allows a time-optimized and/or energy-optimized utilization of the "wait & run functionality".

However, it is also possible to invoke a washing program if a preheating program has not been executed. The duration of the washing program is however extended thereby, if a comparable cleaning and/or drying effect is to be achieved. If this extension is acceptable, however, some saving of electrical energy is produced.

In the context of the dishwasher according to the invention, particular provision can be made during the heating phase for any circulation and heating of washing liquid to take place only (i.e. essentially exclusively) in the second circulation circuit, such that no washing liquid, or only a small amount of washing liquid, is ducted into the washing compartment via the spraying system or spraying device during the heating phase. In comparison with solutions in which the washing liquid is circulated via the spraying system during the heating phase, it is possible to reduce both heat losses due to heat conduction and heat losses due to evaporation of washing liquid. In this way, the preheating phase can be carried out particularly efficiently. In contrast, if the washing liquid for a desired washing bath quantity were fed back into the washing compartment for preheating by means of the spraying system, it would be distributed over a wide region of the washing compartment. In a corresponding manner, the liquid that was sprayed by means of the spraying system of the first circulation circuit would also be distributed onto the one or more racks that are arranged in the washing compartment and/or onto items to be washed that are placed therein. As a result of this, the washing liquid would come into thermal contact with the washing compartment over a large surface area. Consequently, heat would be dissipated outwards via the washing compartment. Likewise, due to the relatively large volume of the washing compartment, a considerable portion of the washing liquid would evaporate in the washing compartment, and therefore the remaining washing liquid would be cooled further. These disadvantages can be largely avoided if the washing liquid circulates only, i.e. exclusively, in the second circulation circuit. In all, it is thus possible to reduce energy losses during the heating phase for heating up a desired washing bath quantity. As a result of this, the energy consumption for afterheating of the stored washing liquid during a subsequent washing routine can be reduced, thereby improving the energy efficiency of the dishwasher.

According to an advantageous development of the invention, at least a significant portion of the washing liquid that is heated during the heating phase is stored in the mixture store after the preheating cycle, preferably at least until the start of the washing routine. In comparison with solutions in which the heated water is stored in the washing compartment of the dishwasher after completion of the preheating cycle, it is therefore possible further to reduce both heat losses due to heat conduction and heat losses due to evaporation of washing liquid. In contrast, if the preheated washing liquid were stored in the washing compartment, it would be distributed in a lower region of the washing compartment, thereby causing it to come into thermal contact over a large surface area with the floor and/or a collection sump of the washing compartment. This would result in heat being dissipated outwards via the floor or the collection sump. Likewise, due to the relatively large volume of the washing compartment, a considerable portion of the washing liquid could evaporate in the washing compartment, and therefore the remaining washing liquid would be cooled further. These disadvantages can be avoided by using a mixture store of suitable size. In all, it is thus possible to reduce energy losses between the completion of the preheating cycle and the start of the washing routine. It is therefore possible to reduce the energy consumption for afterheating of the stored washing liquid before or during the washing routine, thereby improving the energy efficiency of the dishwasher. In this case, the advantage becomes progressively greater as the duration of this intermediate phase increases due to the operator behavior.

Since moreover the temperature of the stored washing liquid can advantageously be higher at the start of the washing program, an intensive thermal effect is achieved by the washing liquid already at the start of the treatment of the items to be washed, this being noticeable by virtue of enhanced cleaning performance e.g. during a cleaning routine of the washing routine, and this in turn can allow the cleaning routine to be shortened while providing comparable cleaning effect. Furthermore, the items to be washed can be warmed up more quickly during a rinsing routine if preheated washing liquid is utilized in this case, and therefore the items to be washed can more quickly reach the temperature required for a subsequent drying routine. As a result of this, the duration of the overall washing routine can be further reduced.

As a result of storing the preheated washing liquid in a mixture store, it is additionally possible in many cases to prevent a large amount of water vapor from escaping from the dishwasher while loading the washing compartment after a preheating cycle. In particular, this can reduce the extent to which the ambient air is subjected to additional humidity. In addition, any undesired effect of water vapor on the operator can be avoided when loading the washing chamber of the dishwasher. The operating convenience can be increased thereby.

According to a preferred development of the invention, a temperature measuring sequence, which is subsequent to the preheating cycle, can be provided for measuring, by means of a temperature sensor, the temperature of the washing liquid that is heated during the preheating cycle. In this way, any cooling of the washing liquid between the preheating cycle and the start of the washing routine can be identified. As a result of this, it is possible e.g. to adapt the execution of the washing routine to the actual temperature of the washing liquid. The washing liquid can be circulated in the second circulation circuit during the measurement, and therefore the temperature sensor can be arranged at any location in the second circulation circuit. This also results in thorough mixing of the washing liquid, such that a meaningful average temperature can be captured.

According to an advantageous development of the invention, depending on the temperature that is measured during the temperature measuring sequence, provision can be made for an afterheating sequence, during which the washing liquid is preferably circulated and heated in the second circulation circuit. It can thus be ensured that the washing liquid has the intended temperature at the start of the washing routine.

According to a preferred development of the invention, a first partial washing routine of the washing routine, which is preferably started after the preheating cycle and is then optionally selected, is a cleaning routine, in which use is made of washing liquid that was heated and then stored during the preheating cycle. As a result of omitting a prewashing routine, the duration of the overall washing routine can be shortened. As a result of the items to be washed being immediately subjected to preheated washing liquid, a satisfactory cleaning effect can nonetheless be achieved in many cases.

According to an advantageous development of the invention, the preheating cycle can comprise a cleaning phase, before the heating phase, for cleaning a floor region of the washing compartment, wherein washing liquid first circulates via the first circulation circuit and then the circulated washing liquid is pumped out by means of a drain pump. This can prevent the spreading of any dirt which is situated in the floor region of the washing compartment and which, for example, dripped onto the compartment floor from items to be washed that were inserted before the preheating cycle.

According to a preferred development of the invention, the spraying device can have a plurality of spraying elements which can be connected individually to the circulation pump via a water switch, said water switch being controlled in such a way that, during the circulation in the cleaning phase, washing liquid is essentially fed back into the collection sump via a spraying element which is arranged in a lower region of the washing compartment. Spray devices in modern dishwashers normally have a plurality of spraying elements which are individually connectable to the circulation pump, wherein the spraying elements can be of fixed or mobile design. In addition to this, provision is usually made for a water switch which can be controlled by the control device in such a way that the spraying elements are supplied with washing liquid individually, in groups or all together.

If the water switch now is suitably controlled such that, during the cleaning phase, washing liquid is essentially introduced into the washing compartment via a spraying element which is arranged in a lower region of the washing compartment or via a plurality of spraying elements which are arranged in a lower region of the washing chamber, it is possible to reduce any contact of the washing liquid during the cleaning phase with any items to be washed that are already loaded. In this way, it is possible to prevent any dirt that is adhering to the items to be washed from being detached and deposited in the floor region of the washing compartment, which would be counterproductive during the cleaning of the floor region.

According to an advantageous development of the invention, the rotational speed of the circulation pump, during the circulation in the cleaning phase of the preheating cycle, is controlled in particular such that it is lower than its rated speed. In this way, a lower circulation speed is produced during the cleaning phase than e.g. during a cleaning routine of a washing routine. In particular, this results in the washing liquid leaving the spray elements of the spraying device at a lower speed. In this way, the washing liquid that is sprayed into the washing chamber is less distributed in the washing compartment, thereby further reducing the risk of any dirt which adheres to the items to be washed becoming detached in the cleaning phase of the preheating cycle.

According to a preferred development of the invention, the rotational speed of the circulation pump, during the circulation in the cleaning phase, is controlled in particular such that washing liquid emerging from a spraying element which is arranged beneath a rack does not in the main reach the rack and/or the items to be washed that are located therein. During the circulation in the cleaning phase, therefore, the rack and/or any items to be washed that are located therein are only slightly or are not subjected to washing liquid which could possibly emerge from a spraying element that is arranged beneath the rack. This could occur, for example, if the water switch does not tightly close the output to the relevant (particularly lower) spraying element of the spraying system and some leakage liquid is pumped into the spraying element concerned. As a rule, modern dishwashers have one or more racks in which to place items to be washed. In many cases, a rotatably mounted spraying arm is arranged beneath the available racks, and has outlet nozzles on its upper side for washing liquid. In this case, during the execution of a washing routine, the circulation pump operates at least some of the time at a rotational speed which is sufficiently high that the speed of the washing liquid emerging through the nozzles is so high that the washing liquid reaches the items to be washed in the rack, e.g. for the purpose of cleaning. As a result of reducing the rotational speed of the circulation pump during the cleaning phase of the preheating cycle, it is now possible to ensure that the washing liquid emerges from the nozzles so slowly that the washing liquid comes into contact with neither the rack nor the items to be washed that are located therein. The detachment of dirt adhering to items to be washed can reliably be avoided thus.

According to an advantageous development of the invention, the rotational speed of the circulation pump during a circulation of washing liquid in the second circulation circuit, in particular during the heating phase of the preheating cycle, is lower than during the circulation in the first circulation circuit, and in particular lower than during a water-ducting partial washing routine of the washing routine. It is thus possible to reduce any vortexing of the washing liquid in the washing compartment, thereby resulting in a lower heat emission of the washing liquid.

According to a preferred development of the invention, washing liquid that was introduced into the mixture store during a preceding washing routine is at least partly used in the preheating cycle. The water consumption of the dishwasher can be reduced thus. In addition to this, the washing liquid that is stored in the mixture store normally has at least room temperature and hence a higher temperature than raw water from a water supply of a building. The energy requirement for heating the washing liquid during the preheating cycle therefore decreases.

According to an advantageous development of the invention, provision is made for outputting a message after the end of the preheating cycle, wherein said message signals the end of the preheating cycle to the user. The operator is therefore able to use the washing program as soon as possible.

According to an appropriate development of the invention, the message is transferred via an operator interface comprising acoustic and/or optical output means. Acoustic output means can include lamps, LEDs, alphanumeric and/or graphical output means. Optical output means can have e.g. buzzers and/or loudspeakers.

The invention further relates to a method for operating a dishwasher, in particular a dishwasher according to the invention, in which method are executed a washing routine for washing items to be washed in a washing compartment, and a preheating cycle for preheating washing liquid for the washing routine, wherein the preheating cycle comprises a heating phase during which washing liquid is circulated and heated.

In the method according to the invention, provision is made during the heating phase for the washing liquid to be ducted out of the washing compartment, pumped into a mixture store via an input opening, and fed back into the washing compartment via an output opening of the mixture store.

The method according to the invention allows a dishwasher, in particular a dishwasher according to the invention, to operate more efficiently. Developments of the inventive method are explained in the description of the claimed dishwasher.

BRIEF DESCRIPTION OF THE DRAWINGS

The invention and its developments are explained in greater detail below with reference to the figures, in which.

DETAILED DESCRIPTION OF EXEMPLARY EMBODIMENTS OF THE PRESENT INVENTION

In FIGS. 1 to 4, only those components of a dishwasher which are required for the understanding of the invention are denoted by reference signs and explained. It is obvious that the dishwasher according to the invention can comprise further parts and modules.

Figure 1:
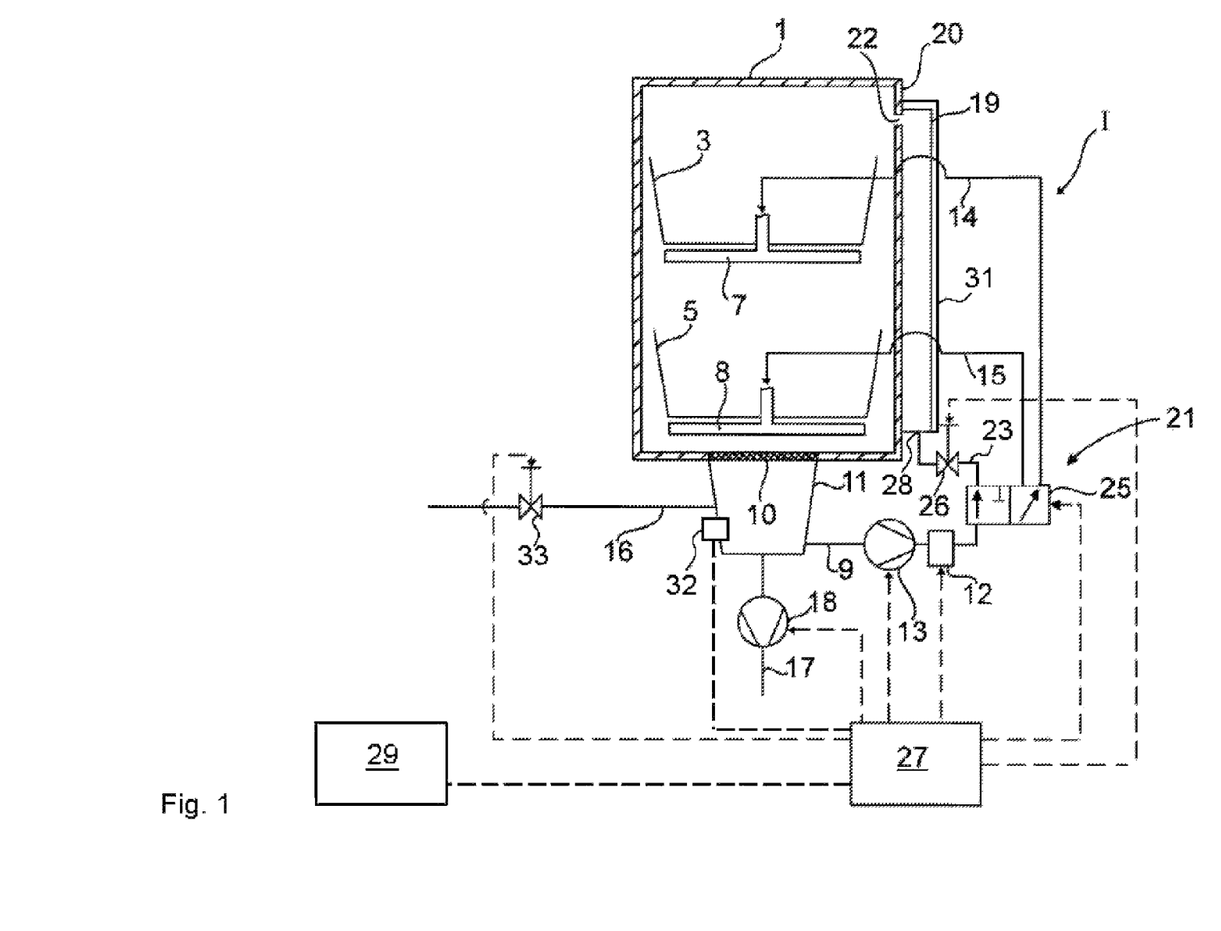
FIG. 1 shows an advantageous exemplary embodiment of a household dishwasher according to the invention in a schematic side view, wherein a first circulation circuit for washing liquid is illustrated.

FIG. 1 schematically shows an advantageous exemplary embodiment of a dishwasher according to the invention, comprising a washing compartment 1 which delimits a washing space. Items to be washed (not shown) can be arranged for cleaning in racks 3, 5 in the washing space of the washing compartment 1. Two spraying arms 7, 8, which are provided at different spraying levels and via which the items to be washed are subjected to washing liquid, are arranged by way of example in the illustrated washing compartment 1. In the washing compartment floor, provision is made for a pump sump 11 having a filter arrangement 10 which is only indicated approximately. A circulation line 9 with a circulation pump 13 that is arranged therein leads away from the pump sump 11. The circulation line 9 is connected in terms of flow to the spray arms 7, 8 via feed lines 14, 15. The circulation line 9 is connected to an input of a water switch 25 in this case. Each of the feed lines 14, 15 is attached to an individually controllable output of the water switch 25, wherein it is at least possible to control the water switch 25 in such a way that one of the spraying arms 7, 8 can selectively be supplied with washing liquid. A connection line 23 leading to the mixture store 19 is attached to a further output of the water switch 25. Also arranged in the connection line 23 is a non-return valve 26, which is opened while the mixture store 19 is being filled or emptied via its input opening 28. In contrast, it is closed during the storage of washing liquid in the mixture store 19. Downstream of the circulation pump 13 is a water heater 12 which is referred to as a heating element 12, e.g. a flow-through heater 12.

The pump sump 11 is additionally coupled via connecting studs to a fresh water feed line 16, which is coupled to the water supply network and in which is arranged an inlet valve 33. The pump sump 11 is likewise connected to a drain line 17, in which is arranged a drain pump 18 for pumping washing liquid out of the washing compartment 1. As a storage container 19 on its right-hand side in FIG. 1, the washing compartment 1 has a so-called mixture store 19 as a mixture store which can be thermally coupled, in the manner of a heat exchanger, and in contact with a side wall 20 of the washing compartment 1. The mixture store 19 allows intermediate storage of washing liquid which is no longer required after execution of a partial program step of a washing routine or washing cycle. In its upper region, the mixture store 19 is connected in terms of flow to the washing space via an aeration/deaeration opening 22.

A control device 27 of the dishwasher is used for the automatic control of operating sequences in accordance with predefined programs which can be selected and activated by an operator via the operator interface 29. In addition to the input of operating instructions, the operator interface 29 is also used to output messages for operator guidance. For example, the completion of a program could be indicated.

In the control device, a plurality of washing programs can be provided for controlling a washing routine, and one or more preheating programs can be provided for controlling a preheating cycle for preparing a preheated washing liquid for a washing routine. The control device 27 is designed in particular to control the inlet valve 33, the drain pump 18, the circulation pump 13, the heating element 12, the water switch 25 and the non-return valve 26, and is connected via control lines to the elements that are to be controlled. The control device 27 is additionally connected to the operator interface 29, for the purpose of preferably bidirectional data interchange, and to a temperature sensor 32 (which is arranged e.g. in the pump sump 11) for capturing the temperature of washing liquid, for the purpose of receiving measured temperature values.

Inter alia, the pump sump 11 with associated filter arrangement 10, the circulation line 9, the circulation pump 13, the heating element 12, the water switch 25, the feed lines 14, 15 and the spraying device 7, 8 are present or integrated in a first, conventional circulation circuit I of the dishwasher for executing partial program steps of the washing routine, these being described below.

In contrast, the mixture store 19 is not integrated in the first hydraulic circuit I. Instead, a branching point 21 is provided downstream of the heating element 12 in the circulation line 9, and a connection line 23 which is attached to an input opening 28 of the mixture store 19 branches off at this point. The water switch 25, which is designed as a three-way switching valve 25, is provided in the branching point 21. In order to circulate the washing liquid in the first circulation circuit I, the water switch 25 is controlled in such a way that at least one of the feed lines 14, 15 is supplied with washing liquid by the circulation pump 13. In this switch setting of the three-way switching valve 25, the washing liquid can therefore be circulated in the first circulation circuit I of the dishwasher. In the situation illustrated in FIG. 1, the non-return valve 26 is closed and therefore the connection to the mixture store 19 is interrupted in this case.

Figure 2:
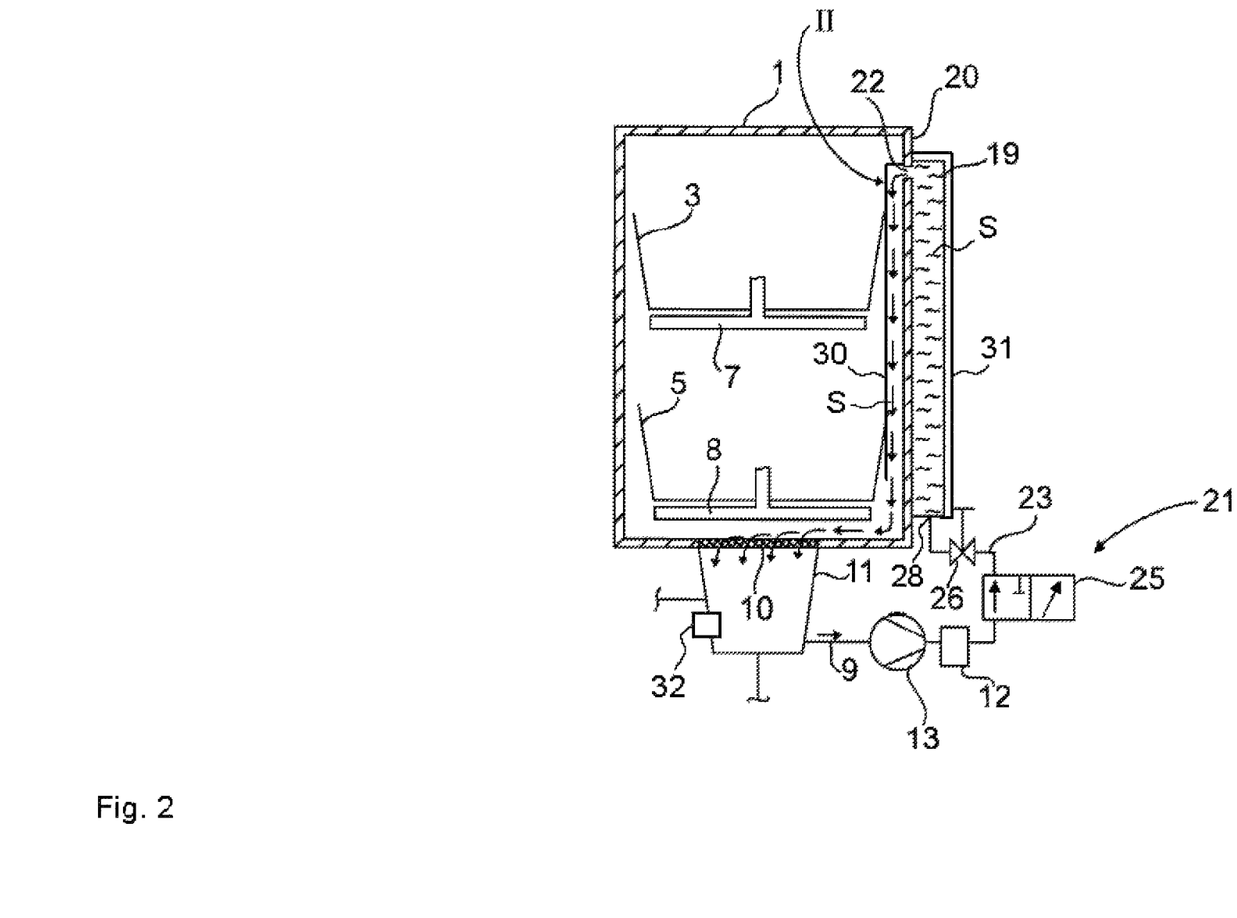
FIG. 2 shows a further illustration of the dishwasher in FIG. 1, wherein a second circulation circuit for washing liquid is illustrated.

In contrast, the non-return valve 26 is open in FIG. 2, such that the washing liquid in the second circulation circuit II can be pumped into the mixture store 19 via the input opening 28, wherein the mixture store 19 is initially filled as far as the output opening 22, this being designed as an overflow 22, and the washing liquid is then introduced into the washing compartment 1 via the aeration/deaeration opening 22. The mixture store 19 is overfilled in such a way that liquid emerges therefrom via an overflow opening and/or overflow opening, and a closed and continuous liquid-circulation circuit is formed between the circulation pump and the mixture store. In this case, the washing liquid in the washing compartment 1 is fed through a return line 30 which is situated in the interior of the washing compartment 1. The outlet of the return line 30 is arranged in a lower region of the washing compartment 1. In this context, it would also be conceivable for an upstream part of the return line 30 to be arranged outside the washing compartment 1, and for only a downstream part of the return line 30 and its outlet to be arranged in the washing compartment 1. After passing through the outlet, the washing liquid runs down the storage container wall 20. The washing liquid is therefore diverted past the racks 3, 5 and the items to be washed that are located therein. The washing liquid S is then guided along a floor of the washing compartment and back into the pump sump 11 with its associated filter arrangement 10.

In a switch setting shown in FIG. 2, the three-way switching valve 25 interrupts the flow path to the feed lines 14, 15. Depending on the switch setting of the three-way switching valve 25 and of the non-return valve 26, it is therefore possible to circulate the washing liquid either mainly, in particular solely, in the first circulation circuit I (FIG. 1) or mainly, in particular solely, in the second circulation circuit II (FIG. 2).

Figure 3:
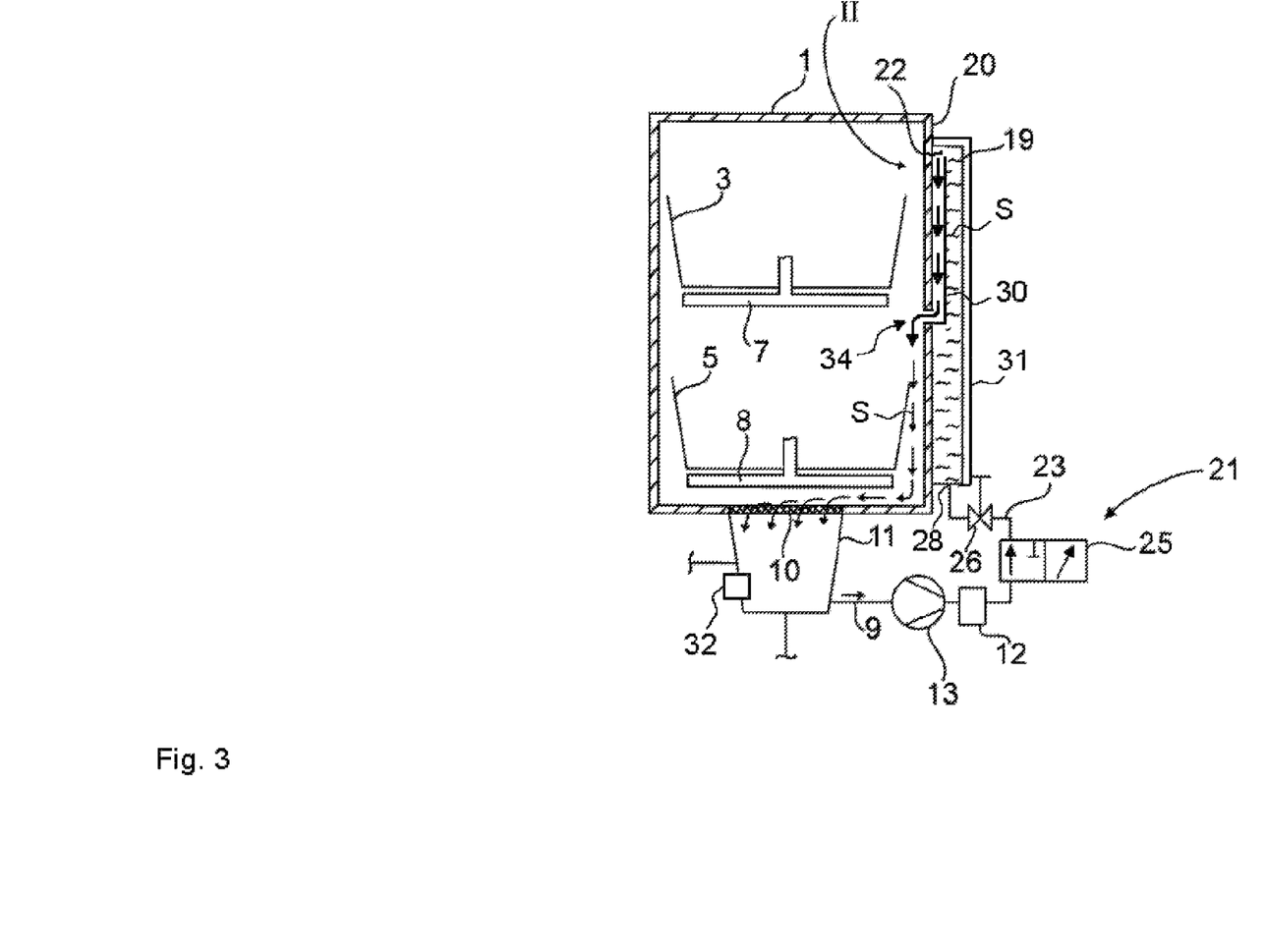
FIG. 3 shows a further advantageous exemplary embodiment of a household dishwasher according to the invention in a schematic side view, wherein the second circulation circuit for washing liquid is illustrated.

FIG. 3 shows a second exemplary embodiment of a dishwasher according to the invention, and illustrates the second circulation circuit II thereof. The first circulation circuit I of the second exemplary embodiment of the inventive dishwasher corresponds to the circulation circuit I of the first exemplary embodiment of the inventive dishwasher as illustrated in FIG. 1, and therefore does not need to be illustrated separately.

As illustrated in FIG. 3, the return line 30 according to the second exemplary embodiment runs outside the washing compartment 1. In this case, it extends from the output opening 22 (which is designed as an overflow 22) of the mixture store 19 to an input opening 34 of the washing compartment 1. The return line 30 is integrated into the mixture store 19 in this case. It runs in the interior of the mixture store 19 here. By virtue of this structural format, the useful internal volume of the washing compartment 1 is increased in comparison with the first exemplary embodiment. At the same time, the structural space required outside the washing compartment 1 is not increased.

During the circulation of the washing liquor S in the second circulation circuit II, the washing liquor S is pumped into the mixture store 19 as described previously in relation to the first exemplary embodiment. When said mixture store 19 is full, the washing liquor S is routed via the overflow 22 and the return line 30 to the input opening 34 of the washing compartment. The input opening 34 of the washing compartment is arranged in a central region in relation to the height of the washing compartment 1. Consequently, after passing through the input opening 34, the washing liquor S only runs down a partial height of the wall 20, thereby reducing any heat emission from the washing liquor S to the wall 20. However, the input opening 34 of the washing compartment could also be arranged in a lower region of the washing compartment, such that the heat emission from the washing liquor S to the wall 20 could be reduced further.

In a further exemplary embodiment, it would also be conceivable for the input opening 30 of the washing compartment 1 to be arranged in the floor of the washing compartment, preferably in the immediate vicinity of the collection sump 11. Any transfer of heat to the wall 20 could thus be prevented completely or almost completely. To this end, it would also be possible to connect the return line 30 directly to an opening in a side wall or in the floor of the collection sump, such that the washing liquor S circulating in the circulation circuit II comes into contact with neither the wall 20 nor the floor of the washing compartment.

Figure 4:
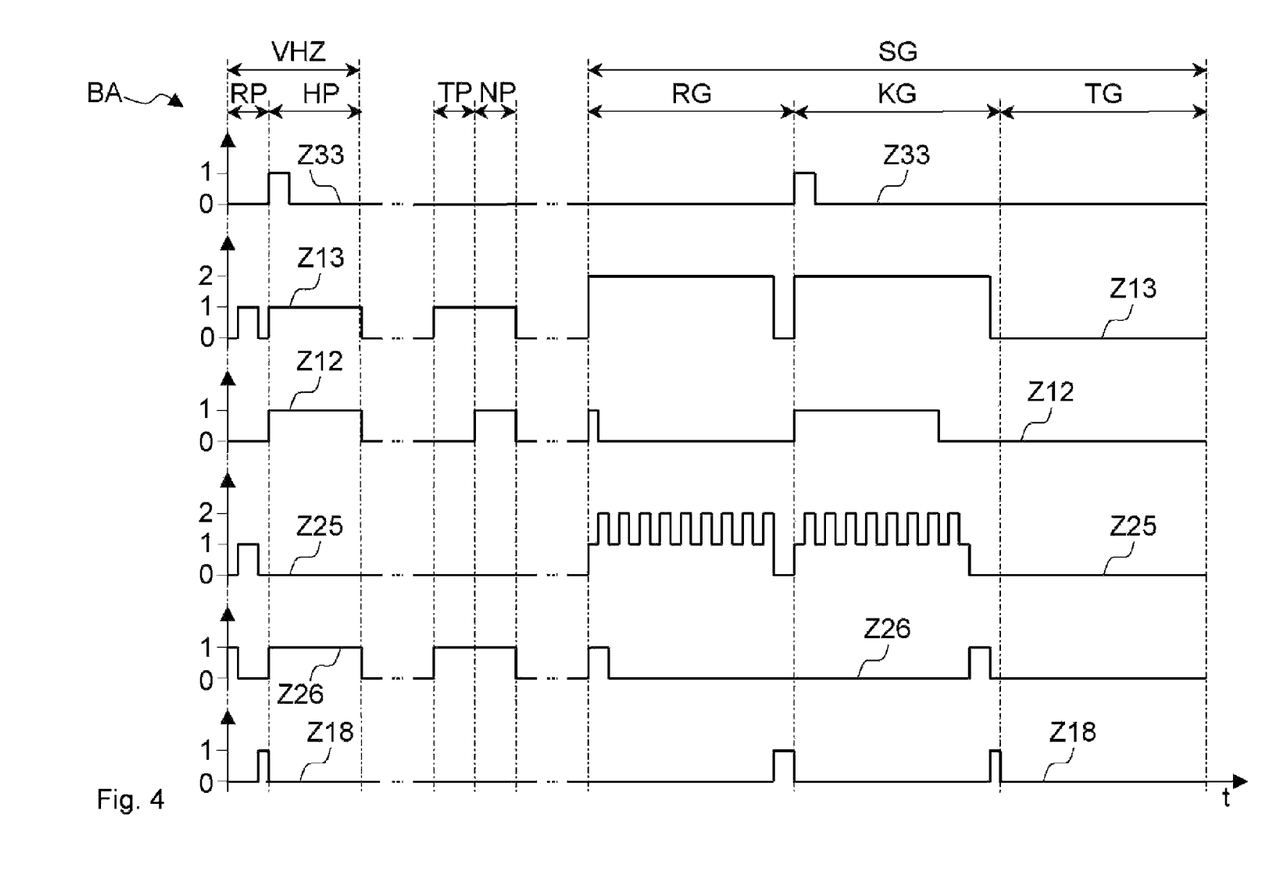
FIG. 4 shows an exemplary operating sequence of the inventive dishwashers in FIGS. 1 and 3.

FIG. 4 shows the temporal sequence of an exemplary operating sequence BA of a dishwasher according to the invention, wherein said dishwasher can be designed according to either the first exemplary embodiment or the second exemplary embodiment, wherein a preheating cycle VHZ and a washing routine SG are represented. On a shared time axis t, a curve Z33 shows the operating state of the inlet valve 33, a curve Z13 shows the operating state of the circulation pump 13, a curve Z12 shows the operating state of the water heater 12, a curve Z25 shows the operating state of the water switch 25, a curve Z26 shows the operating state of the non-return valve 26 and a curve Z18 shows the operating state of the drain pump 18.

At the start of the preheating cycle VHZ, an optional cleaning phase RP is executed for the purpose of precleaning a floor region of the washing compartment 1 in order to prevent dirt from being carried into the mixture store 19 during a subsequent heating phase HP. To this end, an intended quantity of washing liquid S is first introduced into the washing compartment 1 of the dishwasher by opening the non-return valve 26, this being represented by an operating state "1". The inlet valve 33, the circulation pump 13, the heating device 12 and the drain pump 18 are switched off during the filling phase, this state being designated in FIG. 2 as operating state "0" in each case. Furthermore, both outputs of the water switch 25 are closed. This operating state of the water switch is likewise designated as "0" in FIG. 2. When the intended quantity of washing liquid S has been introduced into the washing compartment 1, the non-return valve 26 is closed, this being represented in FIG. 2 as operating state "0".

The washing liquid S is now circulated by means of the circulation pump 13, wherein the circulation pump 13 is operated at a reduced rotational speed. This operating state of the circulation pump 13 is labelled as "1" in FIG. 4. In this case, the water switch 25 is controlled in such a way that only the lower spraying arm 8 is supplied with washing liquid S. This operating state of the water switch 25 is represented as "1" in FIG. 4. Because the non-return valve 26 remains closed in this phase, the washing liquid circulates exclusively in the first circulation circuit I. Consequently, the dirt that is washed off the floor region by the washing liquid S is not transported into the mixture store 19. Because the washing liquid S emerges at only low speed and indeed exclusively from the lower spraying arm 8, the washing liquid S does not reach the items to be washed, and therefore no further dirt is removed from the items to be washed.

Following an adequate circulation time, the circulation pump 13 is switched off, the water switch 25 is closed, and the drain pump 18 is switched on in order to pump out the now soiled washing liquid from the cleaning phase RP. After completing the cleaning phase RP thus, the heating phase HP is executed.

For this purpose, the inlet valve 33 is first opened, this being represented by an operating state "1", so as to receive raw water in order thus to increase the quantity of washing liquid S in the washing compartment 1 of the dishwasher. At the same time, the washing liquid S is circulated in the second circulation circuit II by operating the circulation pump 13 at a low rotational speed again and opening the non-return valve 26. In this case, the water switch 25 remains in the operating state "0", such that no washing liquid is supplied to the spray arms 7, 8. The washing liquid S circulating in the second circulation circuit II is heated by means of the water heater 12 in this case. The "ON" state of the water heater 12 is designated by "1". When the washing liquid S has reached the intended temperature, the water heater 12 and the circulation pump 13 are switched off again. In order to prevent the mixture store 19 from emptying via the input opening 28, the non-return valve 26 is closed at the same time. The heating phase HP and the preheating cycle VHZ are therefore completely finished.

After the end of the preheating cycle VHZ, provision can be made for outputting a message which signals the end of the preheating cycle VHZ to the user. The operator is then in a position to utilize the now available washing routine SG as soon as possible. In this case, the message output can be effected via the operator interface 29, which can comprise acoustic and/or optical output means for this purpose.

During the following quiescent phase or waiting phase WP (i.e. preparation phase), in which a specified heated washing bath quantity is prepared in the mixture store, provision can be made for executing a temperature checking sequence TP, in order that any drop in the temperature of the washing liquid S can be identified. The temperature checking sequence TP can be executed automatically, possibly more than once, after a predefined time has elapsed. To this end, the circulation pump 13 is operated at low rotational speed again and the non-return valve 26 is opened, such that the washing liquid is circulated in the first circulation circuit. As a result of this, the washing liquid S is carried along past the temperature sensor 32, and this can therefore record an average temperature of the washing liquid S. Because the washing liquid S is not routed via the spraying system 7, 8, the washing liquid only cools down slightly during the temperature checking sequence TP.

Following the measurement of the temperature of the washing liquid S, an afterheating phase NP can be executed if the temperature has fallen below a predefined limit value, for example. For this purpose, the dishwasher is operated in the same way as in the heating phase HP of the preheating cycle.

The dishwasher now remains in a quiescent state until the operator starts a washing routine SG by selecting a washing program. In the example in FIG. 4, the washing routine SG comprises (in this order) a cleaning routine RG, a rinsing routine KG and a drying routine TG, i.e. a prewashing routine is omitted in this context. It is obvious that the washing routine SG could also comprise further partial washing routines, e.g. a prewashing routine or an intermediate washing routine.

At the start of the cleaning routine RG, the non-return valve 26 is opened in order to allow the preheated washing liquid S to enter the washing compartment 1. The curve Z26 symbolizes this operating state by briefly assuming the value "1". Likewise at the start of the cleaning routine RG, the circulation pump 13 is switched on and operated at high rotational speed. If necessary, the water heater 12 can also be switched on for a short period if the temperature of the washing liquid S is insufficient. In this case, the water switch 25 is controlled such that the lower spraying arm 8 and the upper spraying arm 7 are alternately supplied with washing liquid S. The curve Z25 shows this by alternately assuming the values "1" and "2". In a final phase of the cleaning routine RG, the circulation pump 13 is switched off and the washing liquid S of the cleaning routine RG is pumped out via a waste-water outlet by means of the drain pump 18.

At the start of the rinsing routine KG, the inlet valve 33 is opened again in order to introduce washing liquid S into the washing compartment 1. The circulation pump 13 is likewise switched on again and is operated at high rotational speed. Because a higher temperature of the washing liquid is normally required during the rinsing routine KG than during a cleaning routine RG, the water heater 12 is normally switched on again for a given period. During the rinsing routine KG, the water switch 25 is likewise controlled such that the spraying arms 7 and 8 are alternately supplied with washing liquid S. At the end of the rinsing routine KG, the washing liquid S of the rinsing routine KG is pumped into the mixture store 19 by closing the water switch 25 and opening the non-return valve 26. After this, the circulation pump 13 is switched off again. If the capacity of the mixture store 19 is insufficient, the excess washing liquid S can be pumped out by means of the drain pump 18.

The subsequent drying of the items to be washed in the drying routine TG takes place e.g. by means of so-called self-drying, whereby the residual water adhering to the items to be washed evaporates and condenses e.g. in the washing compartment 1, or by means of a drying device which is not described in the context of this application.

In all, the duration of the washing routine SG is reduced because preheated washing liquid S is available for the cleaning routine RG by virtue of the previously executed preheating cycle. As a result of this, it is possible to keep the heating times short during the cleaning routine RG.

In an advantageous exemplary embodiment, the invention relates to the heating of a washing liquid before the cleaning of the dishes ("wait & run functionality"). In an exemplary embodiment of the present invention, a first bath quantity for a washing routine is circulated in an external circuit via the mixture store, is heated as part of this activity, and is then stored temporarily (until the actual start of the washing routine) in the mixture store in its warmed state until the actual program start. As a result of this, the interior of the appliance is heated less than was previously the case, thereby allowing an energy saving to be achieved.

The residual water quantity from the heating process, which quantity cannot be held in the mixture store due to the limited volume thereof, is either pumped out of the appliance or remains in the appliance (with a low water level) for the subsequent washing routine. In the case of the second possibility, a decrease in water and energy consumption is normally produced. Any items to be washed that are lying on the floor (e.g. due to incorrect loading or due to an item falling out of the rack) can still be picked up by hand in this case, and do not have to be removed from the hot water bath (as in the case of solutions without a mixture store).

Alternatively, the entire heating bath quantity can however also be temporarily stored in the container floor. An energy saving is produced in comparison with solutions in which the first bath quantity is heated up in the interior of the dishwasher.

In order to prevent dirt from being carried from the floor region of the dishwasher into the mixture store during the heating process, the floor region can be rudimentally precleaned first by draining the water from the mixture store (stored from the previous washing routine) and briefly prewashing the interior using a suitable rotational speed of the circulation pump. The soiled water is pumped out of the appliance after this brief prewash or internal cleaning. Fresh water is then used to fill the appliance and is heated up in the external circulation circuit.

By preparing the appliance and using this method, the customer can be provided with a sort of fast program by shortening the washing time. As a result of bath heating via the external hydraulic circuit, energy is saved in comparison with the conventional internal heating. In comparison with the conventional internal heating, this variant largely eliminates the associated heating of the washing compartment (including insulation), the one or more racks, and/or the items to be washed in the upper and lower racks. It is therefore also possible to perform partial loading while the heating takes place, without thereby affecting the bath heating or its energy consumption. As a result, the invention can offer time-optimized and/or energy-optimized party functionality, i.e. a fast run of a dishwashing program is possible in order to allow quick cleaning of items to be washed, e.g. at a party or celebration, or in other situations when a fast program is desired.

List of Reference Signs
1 Washing compartment
3 Rack
5 Rack
7,8 Spraying arms of a spraying device
9 Circulation line
10 Filter arrangement
11 Pump sump, collection sump
12 Water heater, heating element, flow-through heater
13 Circulation pump
14 Feed line
15 Feed line
16 Freshwater feed line
17 Drain line
18 Drain pump
19 Mixture store, reservoir
20 Washing compartment side wall
21 Branching point
22 Output opening of the mixture store, overflow of the mixture store
23 Connection line
25 Water switch, three-way switching valve
26 Non-return valve
27 Control device
28 Input opening of the mixture store
29 Operator interface
30 Return line
31 Insulation means
32 Temperature sensor
33 Inlet valve
34 Input opening of the washing compartment
I First circulation circuit
II Second circulation circuit
S Washing liquid
BA Operating sequence VHZ Preheating cycle
SG Washing routine
RP Cleaning phase
HP Heating phase
TP Temperature checking sequence
NP Afterheating phase
RG Cleaning routine
KG Rinsing routine
TG Drying routine
Z33 Operating state of the inlet valve
Z13 Operating state of the circulation pump
Z12 Operating state of the heating device
Z25 Operating state of the water switch
Z26 Operating state of the non-return valve
Z18 Operating state of the drain pump

The invention claimed is:

1. A dishwasher, comprising:
    a washing compartment having a wall, the washing compartment to accommodate items to be washed;
    a first circulation circuit to subject the items to be washed in the washing compartment to a washing liquid, the first circulation circuit having:
        a circulation pump to circulate the washing liquid;
        a water heater to heat the circulated washing liquid;
        a spraying device to spray the items to be washed with the circulated washing liquid, wherein, in the first circulation circuit, the washing liquid is routed from the washing compartment to the circulation pump and fed back into the washing compartment via the spraying device;
    a second circulation circuit having the circulation pump of the first circulation circuit, the water heater of the first circulation circuit and a mixture store, the mixture store having an input opening and an output opening; and
    a controller, wherein
    the output opening is disposed on the wall of the washing compartment;
    the controller is configured to control flow of the washing liquid through the second circulation circuit to avoid subjecting the items to be washed to the washing liquid;
    in the first circulation circuit, an output side of the circulation pump has a branching point;
    a plurality of flow controllers is assigned to the branching point to allow the washing liquid to circulate in at least one of the first circulation circuit and the second circulation circuit; and
    in the second circulation circuit, the washing liquid is routed from the washing compartment to the circulation pump, pumped into the mixture store via the input opening of the mixture store, and fed back into the washing compartment via the output opening of the mixture store.

2. The dishwasher of claim 1, wherein, in the second circulation circuit, the washing liquid is fed back into the washing compartment such that the washing liquid flows from the output opening directly down one of a partial height and a full height of an inside of the wall of the washing compartment.

3. The dishwasher of claim 2, wherein the washing liquid runs down the one of the partial height and the full height of a side wall of the washing compartment.

4. The dishwasher of claim 1, further comprising a return line, wherein the output opening is connected to the washing compartment via the return line in order to feed back the washing liquid.

5. The dishwasher of claim 4, wherein the return line leads into the washing compartment in a lower region of the washing compartment.

6. The dishwasher of claim 1, wherein the output opening is an overflow opening.

7. The dishwasher of claim 1, wherein the input opening and the output opening are arranged at opposite end regions of the mixture store.

8. The dishwasher of claim 1, further comprising flow guiding elements that are provided in the mixture store, the flow guiding elements being adapted to reduce formation of non-flowing or slow-flowing zones in the mixture store.

9. The dishwasher of claim 1, wherein the input opening is arranged at a lower end of the mixture store.

10. The dishwasher of claim 1, further comprising a connection line leading to the mixture store; wherein the spraying device has at least one spraying element; wherein the plurality of flow controllers comprises a water switch which has at least one controlled output that is connected to the at least one spraying element of the spraying device; and wherein the water switch has at least one further output that is connected to the connection line leading to the mixture store.

11. The dishwasher of claim 10, wherein the plurality of flow controllers comprise a non-return valve which is arranged in the connection line.

12. The dishwasher of claim 1, wherein the water heater is a flow-through heater.

13. The dishwasher of claim 1, further comprising insulation means which counteract a transfer of heat from the interior of the mixture store to the outside.

14. The dishwasher of claim 1, wherein the controller is configured to invoke at least one washing program to control a washing routine for washing the items to be washed in the washing compartment and to invoke at least one preheating program to control a preheating cycle for preheating the washing liquid for the washing routine; wherein the at least one washing program and the at least one preheating program are invoked separately from each other; and wherein the preheating cycle has a heating phase during which the washing liquid is circulated and heated in the second circulation circuit.

15. The dishwasher of claim 14, wherein at least a majority of the washing liquid that is heated during the heating phase is stored in the mixture store after the preheating cycle.

16. The dishwasher of claim 15, wherein the majority of the washing liquid is stored in the mixture store at least until the start of the washing routine.

17. The dishwasher of claim 14, further comprising a temperature sensor to measure a temperature of the washing liquid that is heated during the preheating cycle in a temperature measuring sequence subsequent to the preheating cycle.

18. The dishwasher of claim 17, wherein, depending on the temperature that is measured during the temperature measuring sequence, the washing liquid is circulated and heated in the second circulation circuit in an afterheating sequence.

19. The dishwasher of claim 14, wherein a first partial washing routine of the washing routine is a cleaning routine in which the washing liquid is used that was heated and then stored during the preheating cycle.

20. The dishwasher of claim 14, further comprising a drain pump, wherein the preheating cycle has a cleaning phase before the heating phase to clean a floor region of the washing compartment during which the washing liquid first circulates via the first circulation circuit and during which the circulated washing liquid is then pumped out by the drain pump.

21. The dishwasher of claim 20, further comprising a collection sump, wherein the spraying device has a plurality of spraying elements that are individually connected to the circulation pump via a water switch; wherein the water switch is controlled such that, during the circulation of the washing liquid in the cleaning phase of the preheating cycle, the washing liquid is essentially fed back into the collection sump via at least one of the plurality of spraying elements which is arranged in a lower region of the washing compartment.

22. The dishwasher of claim 20, wherein, during the circulation in the cleaning phase of the preheating cycle, a rotational speed of the circulation pump is controlled such that the rotational speed is lower than a rated speed of the circulation pump.

23. The dishwasher of claim 22, further comprising a rack, wherein the spraying device has a plurality of spraying elements; and wherein, during the circulation of the washing liquid in the cleaning phase of the preheating cycle, the rotational speed of the circulation pump is controlled such that the washing liquid emerging from at least one of the plurality of spraying elements that is arranged beneath the rack essentially does not reach at least one of the rack and the items to be washed that are located in the rack.

24. The dishwasher of claim 14, wherein, during the circulation of the washing liquid in the second circulation circuit, a rotational speed of the circulation pump is lower than during the circulation of the washing liquid in the first circulation circuit.

25. The dishwasher of claim 24, wherein, during a heating phase of a preheating cycle, the rotational speed of the circulation pump is lower than during a water-conducting partial washing routine of a washing routine.

26. The dishwasher of claim 14, wherein the washing liquid that was introduced into the mixture store during a preceding washing routine is at least partly used in a preheating cycle.

27. The dishwasher of claim 14, wherein a message is output after the end of a preheating cycle, and wherein the message signals the end of the preheating cycle to a user.

28. The dishwasher of claim 27, wherein the message is provided via an operator interface having at least one of acoustic and optical output means.

29. The dishwasher of claim 1, wherein the mixture store as an internal volume sized to store a majority of the washing liquid.

30. The dishwasher of claim 1, wherein the output opening is disposed such that the washing liquid in the second circulation circuit covers a shorter distance in the washing compartment before reaching the circulation pump than washing liquid circulating through the first circulation circuit.

31. The dishwasher of claim 1, further comprising a rack, wherein the output opening is located to avoid subjecting the items to be washed to the washing liquid when the items to be washed are in the rack and the washing liquid is circulated through the output opening.

* * * * *